UNITED STATES PATENT OFFICE.

RUPERT GREVILLE-WILLIAMS, OF ALBANY, NEW YORK, ASSIGNOR TO THE ALBANY COAL TAR, DYE AND CHEMICAL COMPANY, OF SAME PLACE.

PROCESS OF MAKING ORCINE-DYES.

SPECIFICATION forming part of Letters Patent No. 410,058, dated August 27, 1889.

Application filed June 6, 1889. Serial No. 313,385. (No specimens.)

*To all whom it may concern:*

Be it known that I, RUPERT GREVILLE-WILLIAMS, a subject of Her Majesty the Queen of Great Britain, residing at the city of Albany, in the county of Albany and State of New York, have invented certain new and useful Improvements in Processes for the Production of Coloring-Matters having the property of dyeing unmordanted cotton in an alkaline or soap bath, and which colors are fast to washing; and I do hereby declare that the following is a clear, full, and exact description of the invention, that will enable others skilled in the art to which it appertains to make and use the same.

In Patent No. 404,331, dated May 28, 1889, I have patented a process in which I claim the use of orcine, in conjunction with other bodies, to produce coloring-matters. I have since found that the orcine may be replaced by its sodium-chloride compound (Watts, VI, p. 885; De Luyne's Zeitschrift für Chemie (2), IV, p. 703,) and it is the use of this body in the place of orcine that I now claim.

The process consists in combining one molecule of a tetrazo compound of diphenyl, ditolyl, dixylyl, stilbene, fluorene, or naphthaline, or their sulpho-acids, with one molecule of one of the present known sulpho-acids of naphthylamine, and then combining this intermediate product with one molecule of the compound which is formed by combining orcine with chloride of sodium. I produce the chloride-of-sodium compound of orcine in the following manner: A solution of orcine of about five (5) per cent. is saturated with salt (free from lime,) slightly acidulated with hydrochloric acid, and boiled until it shows a green fluorescence on the addition of soda. The solution is then filtered to free it from the organic tarry matters present, and can be used in this state or evaporated to dryness.

The following are some examples of the different combinations that can be made, the first showing how I practically carry out my invention.

Example 1: Twenty-eight (28) pounds of benzidine sulphate (or its equivalent of the base) are converted into tetrazo-diphenyl in the usual and well-known manner, and then run into twenty-five (25) pounds of naphthionate of soda and thirty (30) pounds of acetate of soda dissolved in about one thousand (1,000) pounds of water. This intermediate product is well stirred until all the tetrazo compound is combined. It is then run into fifty (50) pounds of caustic soda dissolved in fifty (50) gallons of water, and a sufficient quantity of the hereinbefore-mentioned chloride-of-sodium compound of orcine to convert the intermediate body into the coloring-matter. The necessary amount of orcine compound required must be ascertained by previous determination, as the strengths of the solutions vary considerably. The temperature is then raised to about 90° centigrade and enough salt added to precipitate the color, which is then filtered off, washed, and dried. The color produced by this method is a brilliant scarlet. In no case must the orcine compound solution be added to the intermediate, or a dull color will be obtained; but, on the contrary, the intermediate must always be added to the orcine compound and soda, so that there is never an excess of the intermediate present.

Example 2: If toluidine be substituted for the benzidine in example 1, a color bluer than that produced by example 1 is formed.

Example 3: Benzidine + beta-naphthylamine monosulpho-acid+orcine-sodium-chloride compound.

Example 4: Benzidine sulpho-acid+naphthionic acid+orcine-sodium chloride.

Example 5: Stilbene diamine sulphuric acid+naphthionic acid+orcine-sodium chloride.

What I claim is—

The new and improved process for the production of coloring-matters, which process consists in combining one molecule of the hereinbefore-described compound of orcine and chloride of sodium with the intermediate product formed by combining one molecule of tetrazo-diphenyl, or one molecule of any of the other herein-mentioned tetrazo bodies, with one molecule of one of the present known sulpho-acids of naphthylamine, substantially as set forth.

RUPERT GREVILLE-WILLIAMS.

Witnesses:
HOWARD S. NEIMAN,
R. A. SHAW.